United States Patent [19]

Schultz

[11] 4,005,524

[45] Feb. 1, 1977

[54] METHOD OF MAKING AN ANTENNA CONNECTOR

[75] Inventor: Ronald L. Schultz, Northfield, Ill.

[73] Assignee: Chromalloy-Alcon, Inc., Chicago, Ill.

[22] Filed: May 8, 1975

[21] Appl. No.: 575,729

Related U.S. Application Data

[62] Division of Ser. No. 492,242, July 26, 1974, Pat. No. 3,936,120.

[52] U.S. Cl. .............................. 29/629; 29/630 R; 113/119

[51] Int. Cl.[2] ....................................... H02G 15/00

[58] Field of Search ............ 29/629, 630 R, 630 A, 29/203 R, 203 D, 203 P, 206; 113/119; 174/75 C, 88 C; 339/177, 183, 95 R, 14 R; 269/321 WE

[56] References Cited

UNITED STATES PATENTS

| | | | |
|---|---|---|---|
| 1,256,666 | 2/1918 | Douglas | 29/629 |
| 3,295,094 | 12/1966 | De Lyon et al. | 339/177 R |
| 3,546,665 | 12/1970 | Zak | 113/119 X |
| 3,723,949 | 3/1973 | Wallo | 339/177 R |
| 3,774,142 | 11/1973 | Siegler | 339/95 R |

*Primary Examiner*—James R. Duzan
*Attorney, Agent, or Firm*—Hill, Gross, Simpson, Van Santen, Steadman, Chiara & Simpson

[57] ABSTRACT

A method of making an electrical connector especially suitable for coupling an antenna leadin with a printed circuit board in a receiver chassis comprising forming up a tubular sheet metal body from an originally flat blank into tubular form with confronting edges along a longitudinal joint, providing opposite ends of the body with means for mounting it in functioning position, assembling within the body a member such as a dielectric support carrying an electrical contact in electrically contacting relation at a location within the body spaced from one end of the body which provides an opening into a plug-receiving socket between said one end and said support and mechanically interlocking the dielectric support and the body to retain the body against spreading open at the joint in the vicinity of the support. More specifically, interlocking lug-means are driven from the body into a recess in the support to effect the interlocking relationship.

11 Claims, 10 Drawing Figures

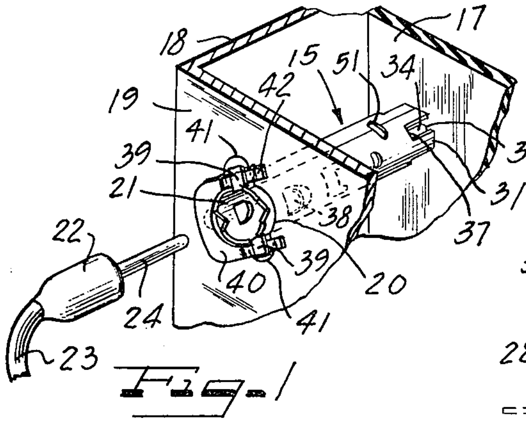
Fig. 1
Fig. 2
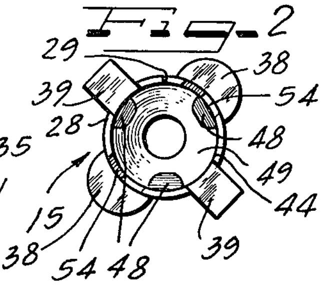
Fig. 3
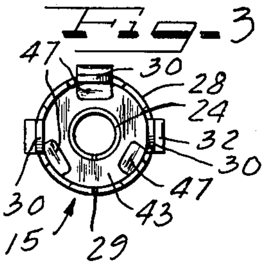
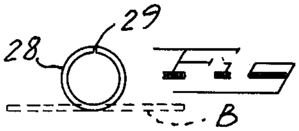
Fig. 4
Fig. 5
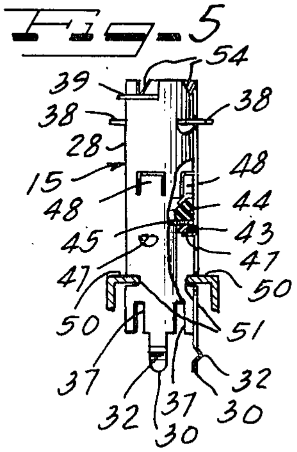
Fig. 6
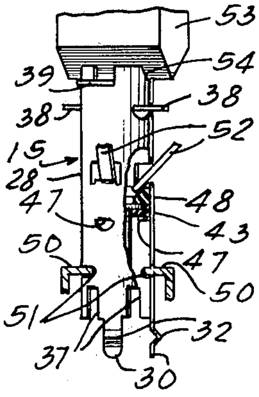
Fig. 7
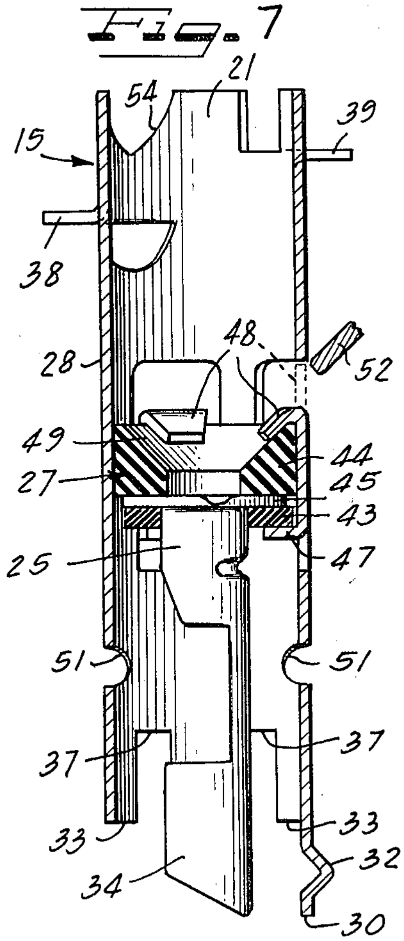
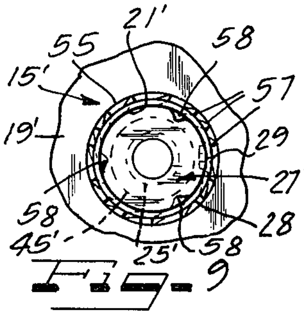
Fig. 9
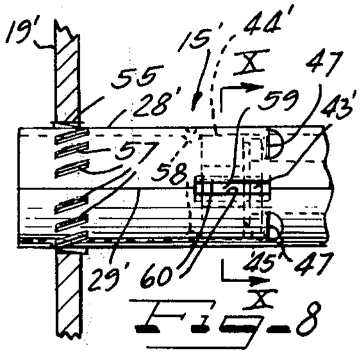
Fig. 8
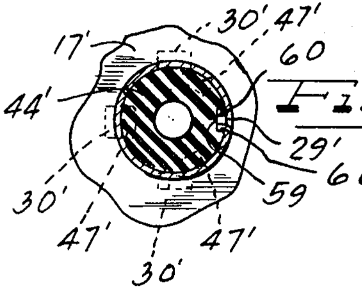
Fig. 10

METHOD OF MAKING AN ANTENNA CONNECTOR

This is a division, of application Ser. No. 492,242, filed July 26, 1974, now U.S. Pat. No. 3,936,120.

This invention relates to a method of making electrical connectors and is more particularly concerned with such connectors especially suitable for coupling antenna leadins with printed circuit boards in receiver chassis.

Electrical tubular connectors have customarily been made as seamless members from tubular stock or as drawn shells. Where the connectors provide female sockets to receive plugs, a substantial problem has existed in properly sizing the sockets to receive the plugs freely but with sufficient frictional engagement to assure retention. An example of such connectors are those employed for coupling an antenna leadin by means of a plug attached to the leadin which is inserted into the socket of a connector supported by a receiver chassis and connected to a printed circuit board. As heretofore constructed, it has been necessary to mount the tubular connectors first in position on the chassis, and then effect connection with the printed circuit board. This has involved a time consuming assembly operation during bench assembly of instruments, and has complicated repairs when required.

An important object of the present invention is to overcome the disadvantages, deficiencies, inefficiencies, shortcomings and problems in prior electrical connectors of the type indicated and to provide a new and improved method of making that structure.

Another object of the invention is to provide a new and improved method of making an electrical connector especially suitable for coupling an antenna leadin with a printed circuit board.

Still another object of the invention is to provide a new and improved method of making an electrical connector economically from sheet metal.

Yet another object of the invention is to provide a method of making a new and improved electrical connector which can be solder connected to a printed circuit board before installation in a receiver chassis.

A still further object of the invention is to provide an electrical connector with new and improved means for releasable connection with a supporting panel.

Other objects, features and advantages of the invention will be readily apparent from the following description of certain preferred embodiments thereof, taken in conjunction with the accompanying drawing although variations and modifications may be effected without departing from the spirit and scope of the novel concepts embodied in the disclosure, and in which:

FIG. 1 is a fragmentary isometric view showing an electrical connector embodying features of the present invention in its functioning position;

FIG. 2 is a front end view of the electrical connector;

FIG. 3 is a rear end view of the electrical connector;

FIG. 4 is a schematic view showing how the electrical connector is formed up from flat sheet metal;

FIG. 5 is a side elevational view, partially broken away, of the electrical connector showing it in an intermediate stage of manufacture;

FIG. 6 is a similar side elevational view showing the connector in a final stage of manufacture;

FIG. 7 is an enlarged diametrical vertical sectional detail view through the electrical connector;

FIG. 8 is a fragmentary side elevational view of a modified form of the connector;

FIG. 9 is a front end view of the connector of FIG. 8; and

FIG. 10 is a sectional detail view taken substantially along the line X—X of FIG. 8.

In FIG. 1 a representative installation of a connector 15 embodying features of the invention has been depicted, and comprising a printed circuit board 17 located within a receiver chassis 18 including a mounting element 19 which for convenience herein will be referred to as a panel. One end of connector 15 is constructed and arranged to be mounted on and in association with the board 17 in permanent, unitary relation wherewith so that the connector can be bench assembled with the board as a modular unit. At its opposite end, the connector 15 is constructed and arranged to be mounted on and in association with the chassis panel 19 by assembling such end through an opening 20 in the panel. As thus mounted, the connector 15 provides a socket 21 within which is adapted to be received an antenna lead-in plug 22 attached to a lead-in conductor 23 such as a coaxial cable. Within the socket 21, the outer shell of the plug 22 makes a grounding connection with the connector 15 and through the connector with the chassis 18, and a central finger extension 24 of the plug is received in a tubular contact 25 (FIG. 7) carried by a dielectric support 27 located within the body of the connector 15 spaced from the socket end and supporting the contact 25 insulated from the shell of the connector.

According to the present invention the connector 15 is formed up from an initially flat blank B (FIG. 4) of suitable sheet metal bent about a cylinder axis into a tubular body 28 with longitudinal edges confronting in a longitudinal joint 29. Thereby, all of various integral appurtenant features of the tubular connector shell can be easily and economically formed by progressive die sheet metal manufacturing techniques, eliminating any need for deep drawing dies, or for costly devices to process seamless tubing pieces.

At one end which may be termed the base end, the tubular body 28 is provided with means for retention in assembly with the printed circuit board 17. This comprises a plurality, such as three, generally axially extending, circumferentially spaced, resilient, snap-in tabs, fingers or lugs 30 (FIGS. 3 and 5–7) which are engageable through suitable slots 31 in the board 17 to engage respective shoulders 32 of the lugs against a back face of the board 17 and draw axially facing shoulders 33 on the end of the body 28 adjacently spaced from the lugs firmly against the front face of the board 17. As will be observed in FIG. 7, the tubular contact 25 has a terminal 34 which extends sufficiently beyond the shoulders 33 to project through a suitable opening 35 in the board 17 to enable soldered connection of the terminal with suitable printed circuit lead (not shown) on the back face of the board 17. One or more of the lugs 32 may be soldered to one or more grounding leads. In order to facilitate dip soldering connection of the printed circuit leads to the appropriate parts of the connector 15, the board-connected end of the body 28 is provided with flux drain slots or notches 37 opening endwise adjacent to and between the lugs 32. The openings defined by the notches 37 also serve a useful function in avoiding moisture accumulation in service within the tubular body 28 of the connector.

At its opposite, forward socket end, the connector body 28 is provided with means for mounting it in functioning position with respect to the chassis panel 19. For this purpose, a pair of diametrically opposite ear-like integral shoulder lugs 38 (FIGS. 1, 2 and 4–7) are struck from the body 28 and project laterally from the body to engage against the inner side of the panel 19. At right angles to the mounting lugs 38, a pair of diametrically opposite laterally outwardly projecting locking lugs 39 are struck integrally from the body 28 in outwardly spaced relation relative to the plane of the lugs 38 sufficient to accomodate the thickness of the panel 19 plus a locking device comprising a wedging fastener in the form of a forked warped spring washer or grounding and coupling clip 40. Through this arrangement, after the socket end portion of the connector body 28 has been inserted through the panel opening 20, with the locking lugs 39 freely passing through respective lateral clearance elongations 41 at diametrically opposite sides of the opening 20 in the panel 19, the locking clip 40 is moved into position as a yoke about the body 28 and in electrical contact between the panel 19 and the locking lugs 39. As soon as the hump spring locking fingers 42 of the locking clip 40 bridge across the hole elongations 41 and lock the lugs 39 against retraction, the connector 15 is locked in place on the panel 19 and firmly retained against axial inward displacement when the plug 22 is plugged into the connector socket 21. The lugs 38 resist outward displacement when the plug 22 is withdrawn from the socket 21.

New and improved means are provided for connecting the dielectric support 27 and the body 28 together, including a mechanical interlock retaining the body against spreading open at the joint 29. In this instance, the dielectric support 27 comprises a relatively thin dielectric backwasher 43 and a thicker front washer 44 between which a head flange 45 of the tubular contact 25 is clamped. At least the front washer 44 is of a diameter complementary to the inside diameter of the body 28. Positioning of the dielectric support and contact assembly intermediate the length of the body 28 and suitably spaced from its socket end is effected by means of a plurality, herein three inwardly struck integral equidistantly circumferentially spaced lugs 47 on the body against which the washer 43 engages. At the opposite end of the assembly a plurality, herein three, circumferentially equidistantly spaced integral mechanical interlock lugs 48 are struck inwardly from the body 28 into engagement with the outer washer 44 and thereby clamp the support and contact assembly firmly in place.

In addition to their function as securing lugs for the support 27, the lugs 48 function in cooperation with the outer washer 44 to retain the body 28 against spreading open about the support 27, and, in fact, serve to draw and hold the body 28 tightly about the support 27, and especially the thicker washer 44. For this purpose, the outer end of the washer 44 is provided with a recess 49 in the form of a frustoconically tapered counterbore leading to the entrance into the contact 25. The contacts 48 are bent into gripping interlock relation over the lip defining the outer end of the counterbore and engage within the counterbore to effect a thorough gripping retention with the washer 44. Although the annular area of the body 28 about the support 27 is firmly held against spreading open at the joint 29, the section of the length of the connector body 28 providing the socket 21 can yield slightly diametrically when the plug 22 is inserted. Thereby, by having a slight differential undersize of the inside diameter of the body 28 relative to the outside diameter of the plug 22, assurance of thorough frictional retention of the plug 22 within the socket is provided and positive electrical grounding contact maintained between the shell of the plug and the tube wall of the connector body 28 which is in thoroughly grounded mounted connection with the chassis panel 19 through the lugs 38 and 39 and the clip 40.

In making the connector 15, the clamping and gripping lugs 48 are initially merely partially separated from the material of the tubular body 28, as shown in full line in FIG. 5 and in phantom outline in FIG. 7, whereby the lugs 48 remain in the wall plane of the body 28 when it is formed up from the blank B into the tubular form represented in FIG. 4. In other respects all of the features of the body 28 are complete and ready for installation. Completion of the connector 15 is then effected by assembling the contact 25 and the support 27 within the body 28 on the preformed lugs 47 and finally mechanically interlocking the support 27 and the body 28 by bending the lugs 48 inwardly and into gripping, clamping and interlocking engagement with the washer 44. For this purpose, the body 28 is engaged on rails 50 (FIGS. 5 and 6) which are received in diametrically opposite, parallel, transverse rail slots 51 provided for this purpose in the base end portion of the body 28. As the body 28 rides along the rails 50, the contact 25 and the dielectric support 27 as an assembly are inserted into the body 28 through the socket end thereof and into position on the shoulder lugs 47. The assembly is then completed while the body 28 is still on the rails 50 by driving respective bending punches 52 from suitable clearance relation to the body 28 in converging oblique relation toward and against the lugs 48, as shown in FIGS. 6 and 7, to drive the lugs 48 inwardly onto the washer 44 and into interlocking relation with the shoulder within the recess provided by counterbore 49 and which shoulder faces generally away from the direction in which the edges at the joint 29 tend to move in spreading apart. In order to maintain the body 28 accurately oriented with the lug upsetting punches 52 and to stabilize the body 28 on the rails 50 during operation of the punches, means comprising a wedge shaped crown-engaging bar 53 engages with the socket or crown end of the shell of the body 28 within respective wedge shaped diametrically opposite outwardly opening notches 54 provided for this purpose in the body. Thus while the body 28 is firmly held by and between the rails 50 and the stabilizing bar 53, the lugs 48 are upset by the punches 52 and into the retaining, clamping interlocking engagement with the washer 44. After this operation, the connector 15 may be plated if desired or otherwise finished and is ready for assembly with the printed circuit board 17 which may be effected as a bench assembly procedure, whereafter the connector 15 and the printed circuit board 17 as a modular unit may be mounted in the chassis 18, and more particularly with the socket end of the connector assembled with and secured in place in the panel 19, as has already been described.

In a modified and somewhat simpler construction, a connector 15′ (FIGS. 8–10) includes a tubular, elongated shell body 28′ formed up from a flat sheet metal blank similarly as described for the connector 15. At one end, the body 28′ is provided with means for mounting it on and in association with a printed circuit board 17' and including shoulder tabs or lugs 30', similar to the corresponding spring finger shoulder mounting lugs 30 of the connector 15.

Instead of a system of mounting and retaining lugs, means are provided on the head or socket end of the body 28' for reception through and within a cylindrical hole 55 in a chassis panel 19' for effecting grounding electrical connection with the panel. For this purpose, the body 28' is provided with an annular series of a plurality of circumferentially spaced helically oriented narrow biting vanes 57 struck integrally by partial separation from the body 28' and projecting generally radially outwardly from the body to a diameter about the same as the diameter of the hole 55. Through this arrangement, after the connector 15' has been mounted by the printed circuit board 17', the connector is adapted to be placed in mounted relation to the chassis panel 19' by projecting the socket end portion of the connector through the hole 55 until the series of vanes 57 are aligned with their outer edges contiguous to the surface defining the hole 55. Contiguity of the vane edges to the hole surface may be frictional engagement, but may be a fairly easy sliding fit for ease in assembly. By having the area of the socket 21' of the connector body 28' slightly undersize in diameter relative to the outside diameter of the shell of a plug to be received therein, when the plug is inserted into the socket, spreading of the socket area along the longitudinal split joint 29' causes the vanes 57 to be spread into firm biting engagement with the wall defining the hole 55. This biting interengagement results in making excellent grounding electrical contact with the chassis panel 19', but also effects a firm anchorage of the body 28' against shifting longitudinally when the plug is inserted into the socket of the connector 15' but also when the plug is withdrawn from the socket. Such resistance to longitudinal displacement of the connector 15' is substantially enhanced by the generally helical disposition of the biting vanes 57 since the opposite or base end of the connector 15' is held by its mounting on the board 17' firmly against any torsional displacement. By having the vanes 57 slightly inclined from a true radius, they can yield slightly resiliently as the socket is expanded when a plug is inserted therein, so that binding of the plug is avoided while nevertheless the plug is quite firmly frictionally gripped by the socket portion of the body 28' for excellent electrical grounding contact.

Mounting of the tubular contact 25' with its lateral head flange 45' stacked and clamped between the back dielectric washer 43' and the front thicker dielectric washer 44' of the dielectric support 27 is effected within the tubular housing 28' in the same manner as described for the connector 15, namely, by inserting the assembly through the socket end of the connector 15' and supporting the backwasher 43' on inturned shoulder lugs 47'. In this instance the dielectric support 27' is secured in place by means of a circumferential series such as three indents 58 which engage the outer corner of the thicker washer 44' and retain it in clamping engagement with the flange 45' and the backwasher 43' and against the shoulder lugs 47'.

For mechanically interlocking the dielectric support 27' and the body 28' to retain the body against spreading open at the joint 29' in the area of the support 27', the washer stack 43', 44' is provided in its outer perimeter with a longitudinally extending recess slot 59, and the body 28' is provided with a pair of inturned interlock lugs 60 which extend into the recess 59 and engage the shoulders provided by longitudinal radially extending walls defining the recess and facing generally away from the direction in which the edges of the body at the joint 29' tend to move in spreading apart to retain the body 28' tightly, wrappingly, snuggly engaged with the dielectric support 27'. It will be understood that as initially constructed, and before the dielectric support and contact assembly has been inserted into the tube of the body 28', the interlock lugs 60 lie flush within the tubular plane of the body 28' so as to avoid any interference with the assembling operation. After the washer and contact stack has been secured within the body 28', the interlock lugs 60 are bendably upset by suitable tool into the recess 59 and into interlocking engagement with the shoulder walls of the dielectric support 27' within the recess. In this arrangement, as in the arrangement of the connector 15, a substantial length of the connector beyond the interlock connection to the socket end of the connector is free to expand slightly as permitted by the joint 29' when a plug is inserted into the socket. On such occurrence, the vanes 57 assure that expansion of the socket area of the body 28' will be uniform and that the joint 29' will expand only slightly, so that there is no liability of the interlock lugs 60 working out of interlocking engagement with the wall surfaces within the slot 59.

In both forms of the invention disclosed, maintaining the joint in the tubular housing shell body as tight as practicable about the dielectric contact mount or support and from there to the base of the connector which surrounds the contact, assures continuity of shielding, that is shielding integrity from the coaxial cable to the radio frequency stage of the amplifier.

It will be understood that variations and modifications may be effected without departing from the spirit and scope of the novel concepts of this invention.

I claim as my invention:

1. A method of making an electrical connector especially suitable for coupling an antenna leadin with a printed circuit board and a receiver chassis, comprising:

bending an originally flat sheet metal blank about a cylinder axis into a tubular form body and bringing longitudinal edges of the blank into confronting edge-to-edge relation along a longitudinal joint;

forming on opposite ends of said body means for mounting it in functioning position;

assembling within said body a dielectric support carrying an electrical contact in electrically insulated relation at a location within the body spaced from one end of the body and providing an opening into a plug-receiving socket defined by the body between said one end and said support;

deforming material of the blank into engagement with the dielectric support and thereby mechanically interlocking the dielectric support to the body; and effecting substantial retention of the body against spreading open at said joint contiguous to said support by said deforming material of the blank, but leaving the joint from the support entirely to said one end of the body free to expand when an oversize plug is inserted into the socket.

2. A method according to claim 1, comprising driving interlock lug means from said body into a recess in said support and thereby effecting said material-deforming interlocking.

3. A method according to claim 1, comprising bending interlock lug means at opposite sides of the joint against shoulder means in a recess in the support and facing generally away from the direction in which the edges tend to move in spreading apart at the joint.

4. A method according to claim 2, comprising bending said lug means in the form of lugs partially struck from the sheet metal body into engagement in a frustoconical recess at one end of said support.

5. A method according to claim 2, comprising bending the interlock means in the form of lugs into a longitudinally extending recess in the perimeter of the support.

6. A method according to claim 2, comprising bending the interlock lug means at opposite sides of the joint against shoulder means in the recess facing generally away from the direction in which the edges tend to move in spreading apart at the joint.

7. A method of making an electrical connector especially suitable for coupling an antenna leadin with a printed circuit board and a receiver chassis, comprising:

forming an originally flat sheet metal blank into tubular form with confronting edges along a longitudinal joint;

providing opposite ends of said body with means for mounting it in functioning position;

assembling within said body a dielectric support carrying an electrical contact in electrically insulated relation at a location within the body spaced from one end of the body which provides an opening into a plug-receiving socket between said one end and said support;

mechanically interlocking the dielectric support to the body and thereby retaining the body against spreading open at said joint in the vicinity of said support; and forming on one end portion of said body longitudinally spaced laterally radially outwardly projecting lugs and thereby providing mounting means at that end portion of the body.

8. A method of making an electrical connector especially suitable for coupling an antenna leadin with a printed circuit board and a receiver chassis, comprising:

forming an originally flat sheet metal blank into tubular form with confronting edges along a longitudinal joint;

providing opposite ends of said body with means for mounting it in functioning position;

assembling within said body a dielectric support carrying an electrical contact in electrically insulated relation at a location within the body spaced from one end of the body which provides an opening into a plug-receiving socket between said one end and said support;

mechanically interlocking the dielectric support to the body and thereby retaining the body against spreading open at said joint in the vicinity of said support; and forming in said body adjacent to one of its ends a series of radially outwardly projecting integrally struck out biting vanes and thereby providing said means for mounting at such end of the body.

9. A method of making an electrical connector especially suitable for coupling an antenna leadin with a printed circuit board and a receiver chassis, comprising:

forming an originally flat sheet metal blank into tubular form with confronting edges along a longitudinal joint;

providing opposite ends of said body with means for mounting it in functioning position;

assembling within said body a dielectric support carrying an electrical contact in electrically insulated relation at a location within the body spaced from one end of the body which provides an opening into a plug-receiving socket between said one end and said support;

mechanically interlocking the dielectric support to the body and thereby retaining the body against spreading open at said joint in the vicinity of said support; and forming in said body a pair of parallel, diametrically opposite transverse slots adjacent to one of the ends of the body, and engaging in such slots rails for handling of the body during assembly of said support therein and said step of mechanically interlocking.

10. A method according to claim 9, comprising forming notches at one end of said body, and engaging a stabilizing member in said notches and thereby holding the body in position on the rails during said step of mechanically interlocking.

11. A method according to claim 10, comprising providing the body with interlock lugs at apertures in the body, and while the body is carried by said rails and stabilized by said stabilizing member driving upsetting punches against said lugs and thereby effecting said mechanically interlocking said support to the body.

* * * * *